Figure 2:
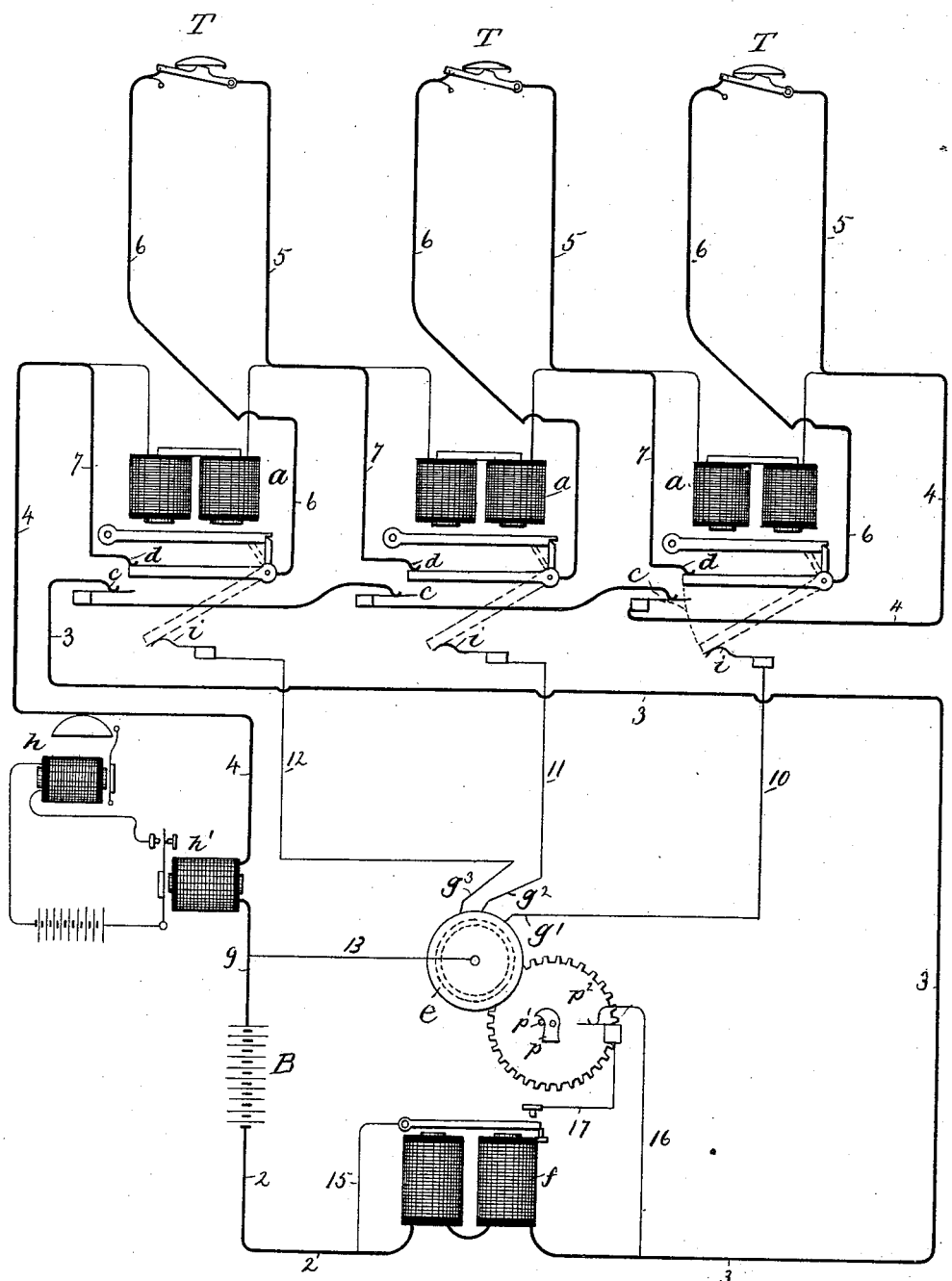

(No Model.) 2 Sheets—Sheet 1.
M. MARTIN.
AUTOMATIC FIRE ALARM TELEGRAPH.
No. 464,510. Patented Dec. 8, 1891.
Fig. 1.
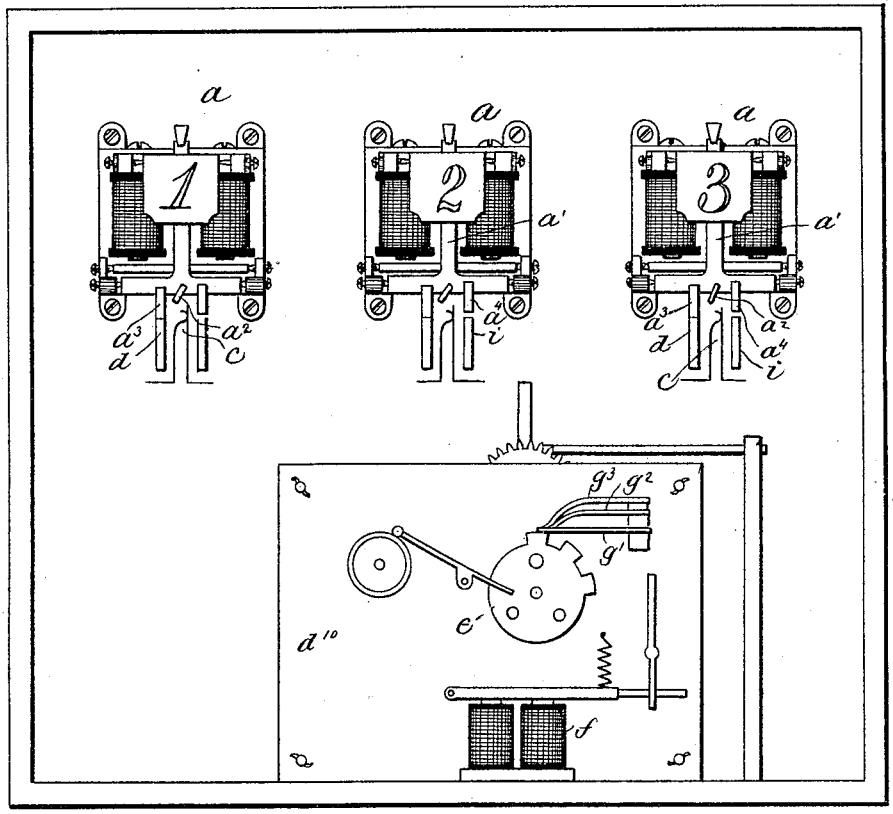
Fig. 4. Fig. 5. Fig. 3.
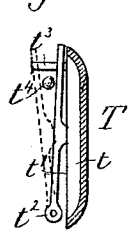 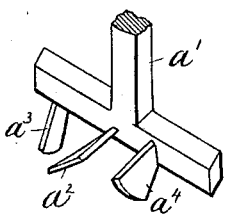 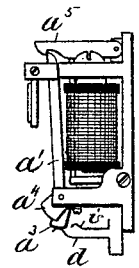
Witnesses
Jas. J. Maloney.
A. J. Locke.
Inventor,
Morris Martin,
by Jos. P. Livermore
Att'y.

(No Model.) 2 Sheets—Sheet 2.

M. MARTIN.
AUTOMATIC FIRE ALARM TELEGRAPH.

No. 464,510. Patented Dec. 8, 1891.

Witnesses,
Jas. J. Maloney.
A. J. Locke.

Inventor,
Morris Martin
by Jn. P. Livermore
Att'y.

UNITED STATES PATENT OFFICE.

MORRIS MARTIN, OF MALDEN, MASSACHUSETTS, ASSIGNOR, BY MESNE ASSIGNMENTS, TO JOHN F. NIELSON, OF ELIZABETH, NEW JERSEY.

AUTOMATIC FIRE-ALARM TELEGRAPH.

SPECIFICATION forming part of Letters Patent No. 464,510, dated December 8, 1891.

Application filed February 21, 1887. Serial No. 228,409. (No model.)

*To all whom it may concern:*

Be it known that I, MORRIS MARTIN, of Malden, county of Middlesex, State of Massachusetts, have invented an Improvement in Automatic Fire-Alarms, of which the following description, in connection with the accompanying drawings, is a specification, like letters and figures on the drawings representing like parts.

My invention relates to an automatic fire-alarm apparatus of that class in which a telegraphic message or alarm is automatically transmitted upon the breaking out of a fire, the transmitting apparatus being controlled by a thermostatic device which causes the transmitter to be set in operation when the temperature at the thermostatic device rises above a predetermined limit.

The present invention is embodied in an apparatus working on the closed-circuit plan with a current normally flowing through the circuit, and in apparatus of this kind as usually made the thermostatic instrument operates to open the circuit in order to produce the signal, and there is commonly no means of distinguishing between a signal produced by the accidental rupture of the circuit and one produced by the opening of the circuit effected by the thermostatic instrument. Means have been devised for distinguishing between an accidental break of the circuit and the change in circuit condition normally produced by the thermostatic instrument upon a rise in temperature, and in one plan that has been adopted the thermostatic instrument not only opens the circuit, but also produces some other change in the circuit, either closing it immediately after it is opened or changing the circuit to some other direction.

The present invention consists, mainly, in a novel arrangement of the circuit co-operating with the signal-transmitter and thermostatic instrument, which is arranged to close the circuit after it has been opened by the action of said instrument produced by a rise in temperature.

The invention also consists in details of construction, which will be hereinafter pointed out.

Figure 1 is a front elevation of a portion of the apparatus, including the transmitter by which a signal is produced when a fire breaks out; Fig. 2, a diagram representing the circuit; Fig. 3, a side elevation of one of the indicating-instruments for indicating the locality of a fire; Fig. 4, a detail representing the construction of the thermostatic instrument, and Fig. 5 a detail showing a portion of the annunciator or indicating-instrument.

The invention is embodied in an apparatus the general arrangement and construction of which may be and is shown as substantially the same as represented in Letters Patent No. 329,468, dated November 3, 1885, to which reference may be had, said apparatus comprising a number of indicating-signals or annunciator-drops $a$, the coils of the magnets of which are included in the main circuit, but are normally shunted by a circuit of low resistance, so that the said magnets are normally demagnetized, and their armatures, when not attracted, hold the drops or indicating-signals in their concealed condition.

The annunciator-drop proper consists of a flap hinged on an arm $a'$, normally held elevated by a hook $a^5$, that is disengaged from said arm by the movement of the armature of the magnet when attracted, and thus permits the said arm $a'$ to fall by the action of gravity. The said arm $a'$ constitutes an electric switch or circuit-changer, being shown in this instance as provided with a number of cams $a^2$ $a^3$ $a^4$, (see Fig. 5,) co-operating with springs $c$ $d$ $i$, which cams and springs constitute circuit-controlling devices operated by the fall of the said drop-arm, and the said circuit-controlling devices may be of any other suitable construction, provided that they make the required changes in the circuit when the condition of the controlling-magnet is changed. These circuit-controlling devices are so constructed that the circuit that includes the spring $d$ is closed when the arm $a'$ is held up in its normal or concealed condition and is opened when the said arm is dropped. The circuit that includes the spring $i$ is open at the said spring when the drop is held up and closed when the drop has fallen and remains in its fallen position, and the circuit that includes the spring or circuit-closer $c$ is momentarily broken during the movement of the drop-arm from its upper to its lower position, but is closed when the said drop-arm is in either extreme position.

The circuit-closer $c$ controls the main circuit, producing a momentary break therein as the drop falls, and thus governs the controlling-magnet $f$ of the transmitter $d^{10}$, which transmitter consists of the usual motor or spring-actuated train of wheel-work adapted to rotate a break-wheel or series of break-wheels $e$, co-operating with springs $g'$ $g^2$ $g^3$, corresponding to the different indicating-instruments $a$. Each of the said springs when co-operating with the said break-wheel produces a different signal from the others, which signal may, if desired, be transmitted to a distant point and produced as an audible signal, which will be understood as having the same signification or indicating the same locality as the corresponding visual signal $a$.

The armature of the magnet $f$ acts on the governor or fly of the transmitter-motor and prevents the said motor from running when the armature is attracted, but permits it to run while the armature remains retracted.

The operation of the apparatus will be best understood from Fig. 2, which represents the circuit connections of the devices thus far described, it being understood that the transmitter $d^{10}$ and indicating-instruments $a$ may be and preferably are, located at the same place—as, for example, at the office of a building or connected group of buildings provided with the thermostatic instrument or at some place where there will be somebody constantly in attendance to take immediate action when the instruments are operated and indicate that a fire has broken out. The transmitter $d^{10}$ may control the transmission of a signal to a distant point—such, for instance, as the engine-house or office of a fire department—and it is important that no signal should be transmitted unless a fire has actually broken out, although the indicating-instrument may be operated and the transmitter started and set in motion upon a derangement of the circuit or apparatus that requires a repair or readjustment to be made.

In the diagram Fig. 2 the main circuit which is normally traversed by the current is indicated by heavier lines than the other circuit-conductors, which are called into operation when the apparatus is operated.

The main circuit, deriving its current from the battery B or other suitable source, comprises a conductor 2, connecting one pole of the battery with one terminal of the controlling-magnet $f$ of the transmitter, the other terminal of which magnet is connected by a conductor 3 with the normally-closed circuit-breakers $c$, placed in series in the said circuit, so that when any one of them is opened it opens the circuit. From the said circuit-breakers $c$ the circuit is continued by a conductor 4 to the series of indicating-instruments $a$, the magnets of which are included in the said conductor 4, but each of which is normally shunted by a branch of low resistance 5 6 7, connected with the said conductor 4 at either side of each magnet. The main circuit 4 is extended to one terminal of a relay-magnet $h'$, forming a part of the signal-receiving apparatus, which may be located at any desired point, and from the other terminal of said relay-magnet the main circuit is completed by conductor 9 to the other terminal of the battery B, making a normally-closed metallic circuit including the magnet $f$, which is normally energized, and also including the magnets of the indicator $a$, from which the current is normally deviated through the shunts 5 6 7, so that the said magnets are normally demagnetized. Each of the shunts 5 6 7, corresponding to the different indicating-instruments $a$, includes the corresponding circuit-closer $d$, which is normally closed when the indicator is in its concealed position, and it is to be understood that the said shunts extend out through the region to be protected from fire and include any desired number of thermostatic instruments T. The regions to be protected are divided into different localities—such, for instance, as the different floors of a building or the different buildings of a group of buildings—each of which localities contains one of the shunt-circuits that controls the corresponding indicating-instrument $a$, so that when one of said indicating instruments is operated it shows at once in what locality the fire has broken out. When one of the shunts 5 6 7 is opened, the magnet of the corresponding indicating-instrument is energized and the drop-arm or switch $a'$ permitted to fall by gravity, so as to make certain changes in the circuit. This arm, in the act of falling, opens for a moment the corresponding one of the circuit-breakers $c$ in the main circuit, and thus demagnetizes the magnet $f$, which releases its armature, and the latter by its retractive movement closes a shunt 15 16 17 around the said magnet $f$, which will retain the said magnet demagnetized and its armature retracted until the said shunt is opened, as will be hereinafter described. The retraction of the armature of the magnet $f$ releases the motor $d$, which thus causes the break-wheel $e$ to rotate. The movement of the arm $a'$ of the indicating-instrument changes the connection of the portion 5 6 of the shunt for the indicator-magnet from the continuation 7 of said shunt to the spring $i$ and wire 10, 11, or 12, connecting it with the spring $g'$, $g^2$, or $g^3$, co-operating with the break-wheel $e$. Assuming that the right-hand shunt (represented in Fig. 2) is broken, the corresponding indicator-arm is permitted to drop and connects the shunts 5 6 with the wire 10 and spring $g'$, as indicated by the dotted lines. The break-wheel $e$ is connected by a wire 13 with the wire 9 between the battery $b$ and the relay-magnet $h'$, and it will be seen that if the wire 13 is connected by a conductor of low resistance with the main circuit 4 at the other side of the magnet $h'$ the latter will be shunted and demagnetized.

If the shunt 5 6 is closed directly after it has been opened to operate the indicating-instrument and has been switched into connection with the spring $i$ and wire 10, the magnet $h'$ will be then shunted whenever the spring $g$ makes electrical connection with the wheel $e$ and connected wire 13, and consequently, if one of the shunts 5 6 has been momentarily opened and caused the corresponding indicator-magnet to be energized and its drop-arm released, the relay-magnet $h'$ will be shunted each time that a projection or conducting part of the break-wheel comes in contact with the corresponding spring, and the magnet will be energized again the moment the said shunt is broken at the break-wheel, and the armature of the relay-magnet $h'$ will thus be moved back and forth and will cause the signal $h$ (shown as a gong) to be operated by a magnet in a local circuit controlled by the said relay to respond to the changes in circuit produced by the break-wheel $e$. If, on the other hand, the shunt 5 6 were broken at any point and remained broken, the indicator-magnet would be energized, as before, and the motor of the transmitter set in operation and the indicator-shunt switched into connection with the break-wheel circuit 10 13; but the said break-wheel circuit would be incomplete, extending from the main circuit at 9 by the wires 13 and 10 and spring $i$ along the shunt-circuit 5 6 to the open point therein, and consequently no new path would be afforded for the current of the battery, which would continue to pass through the relay-magnet $h'$, and no signal would be produced on the instrument $h$.

The thermostatic instruments T may be of any suitable construction for opening and immediately afterward closing the circuit when operated by a rise in temperature. A sufficient portion of such an instrument is represented in Fig. 4 as consisting of a small tank or reservoir $t$, having a flexible side $t'$ and containing a volatile liquid, which vaporizes and expands at the temperature at which the thermostat is intended to operate. The vapor in expanding forces the flexible side $t'$ outward, and the latter bears against and moves a switch-arm $t^2$, co-operating with an anvil $t^3$ to complete or close the circuit when the said arm rests on the said anvil. The said arm in its movement from the full to the dotted line position produced by the expansion of the side $t'$ passes over a rounded projection or cam $t^4$, which lifts it for a moment off from the anvil $t^3$ and then permits it to come in contact with the said anvil again, thus making a momentary opening in the shunt-circuit 5 6, connected with said switch-arm and anvil, and immediately afterward closing the said shunt-circuit.

The operation of the thermostat thus not only operates the indicating-instrument $a$ and switch controlled by it and sets the transmitter in operation, but also closes or completes the circuit 13 10 6 5 by which the said transmitter operates on the receiving-instrument $h$. This transmitting-circuit therefore, in accordance with this invention, includes as part of it the circuit containing and controlled directly by the thermostatic instrument.

If any one of the shunts 5 6 7 should be accidentally broken, the corresponding indicator-magnet will be energized and the drop permitted to fall and the signal-transmitter set in operation; but the circuit by which the said transmitter affects the receiving-instrument would be open and inoperative, and consequently the said receiving-instrument $h$ would not sound.

It is understood that there is no fire unless the signal $h$ is operated.

The operation of the indicating-instrument and transmitter $d^{10}$ unaccompanied by an alarm on the instrument $h$ indicates that the circuit has been accidentally broken or deranged in some way, and also shows in what locality the derangement exists, while the operation of the indicating-instrument accompanied by a signal upon the instrument $h$ gives notice that a fire has broken out, and also indicates in what locality the fire is. After the transmitter $d^{10}$ has been set in operation by the demagnetization of its controlling-magnet $f$ it will continue to operate and repeat the signal on the receiving-instrument $h$, provided that the line is effective until the shunt 15 16 17 is opened, which may be effected by a gravitating device $p$, operated by a projection $p'$, turned by one of the arbors of the transmitter-motor and operating to open the circuit-breaker $p^2$ in the said shunt after the motor has run the required period of time, as more fully described in another application for Letters Patent filed herewith.

In the other plans for distinguishing between an accidental rupture of the circuit and the effect of a thermostat thereon invented by me and shown and described in other applications for Letters Patent the thermostat controls the transmitter-circuit through the intervention of an electro-magnet and its armature or relay, and the main novel feature of the present invention consists in making the thermostatic instrument a part of the transmitting-circuit, which it thus controls directly, a plan which has some advantages over the others.

It is obvious that the transmitter-circuit, which is herein shown as consisting, mainly, of the conductor 13 and one of the conductors 10, 11, or 12 and a portion of the corresponding shunt 5 6, need not necessarily operate by shunting the magnet of the receiving-relay $h'$, as any other circuit arrangement in which a receiving-instrument is controlled by the action of a break-wheel or spring or equivalent signal-transmitting device might be used, and it is also plain that the circuit-changing device $a'$ need not necessarily be a part of a visual indicating-instrument, nor need it be of the particular mechanical construction illustrated, as it is obvious that any device controllable by the thermostatic instrument might be employed to make the necessary circuit changes, whether the same device also performs the function of a visual indicator or not.

The invention is not limited to an apparatus in which the signals are produced by a change in temperature of a thermostatic instrument, as it is obvious that the entire apparatus would operate in precisely the same way if the switch-lever $t^2$, (see Fig. 4,) that controls the shunt 5 6, were operated by any other means than the reservoir $t$—as, for example, if it were simply moved by hand—in which case the apparatus would distinguish by the effect on the receiving-instrument $h$ between an intentional change in circuit made by the operator and an accidental rupture or derangement of the circuit. Therefore, so far as the essential features of the novel combination and arrangement forming the subject of this invention are concerned, the invention is not limited to the specific construction of the circuit-controlling device herein represented by the thermostatic instrument or movable switch-arm $t^2$, thereof nor of the circuit-changing device or switch controlled thereby, herein represented by the arm $a'$ and co-operating devices and the electro-magnet that controls the said arm, nor of the transmitting and receiving instruments and transmitting circuit by means of which the receiving-instrument is caused to respond to the changes made in said circuit by the transmitter.

I claim—

1. The combination of an electrically-controlled transmitting-instrument and controlling electric circuit therefor, and a circuit-changer or switch in the said controlling-circuit, having contacts by which it makes a change in said circuit and immediately thereafter restores the same to its original condition, a signal-receiving instrument, and transmitting-circuit connecting the said receiving-instrument with the signaling portion of the transmitting-instrument and including as a part of it a portion of the circuit that controls the transmitting-instrument and is governed by the transmitter-controlling switch, whereby the said transmitting-circuit is complete and operative only when said controlling-circuit is in normal condition, substantially as described.

2. The combination of an electrically-controlled transmitting-instrument and controlling electric circuit therefor, and a circuit-changer or switch in the said controlling-circuit, and an electro-magnet governed by said switch, and a number of electric contacts governed by the armature of said electro-magnet, a pair of said contacts being included in the controlling-circuit for the transmitter and causing it to be set in operation when the said contacts are operated and others of said contacts being connected with the transmitting and controlling circuits to join the same when said electro-magnet is operated, substantially as described.

3. The combination of an electric circuit, a signal-transmitting instrument and electro-magnet controlling the operation thereof included in said circuit, with a switch or circuit-changer that in its movement produces a momentary break in the circuit, and thereby demagnetizes the transmitter-controlling magnet, and a shunt for said magnet closed by the retraction of the armature thereof, and means operated by the transmitter for opening the said shunt, substantially as described.

4. The combination of a circuit-changing device and controlling electro-magnet therefor, and a normally-closed electric circuit connected with said magnet, and a shunt of low resistance around said magnet, and circuit-controlling device therein that operates to momentarily open the said shunt, with a transmitter and circuit controlled by it, and normally-separated contacts operated by said circuit-changing device, connected with the said shunt and the transmitter-controlling circuits, respectively, and adapted to be connected together when the said controlled magnet is affected by the breaking of the shunt around it, substantially as described.

In testimony whereof I have signed my name to this specification in the presence of two subscribing witnesses.

MORRIS MARTIN.

Witnesses:
 Jos. P. LIVERMORE,
 JAS. J. MALONEY.